(12) United States Patent
Inomata et al.

(10) Patent No.: US 8,795,823 B2
(45) Date of Patent: Aug. 5, 2014

(54) OPTICAL LAYERED BODY, POLARIZER AND IMAGE DISPLAY DEVICE

(75) Inventors: Yuya Inomata, Tokyo (JP); Hiroko Suzuki, Tokyo (JP); Makoto Honda, Tokyo (JP); Hiroomi Katagiri, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 417 days.

(21) Appl. No.: 13/388,886

(22) PCT Filed: Jul. 2, 2010

(86) PCT No.: PCT/JP2010/061327
§ 371 (c)(1),
(2), (4) Date: Apr. 16, 2012

(87) PCT Pub. No.: WO2011/016306
PCT Pub. Date: Feb. 10, 2011

(65) Prior Publication Data
US 2012/0189828 A1    Jul. 26, 2012

(30) Foreign Application Priority Data
Aug. 4, 2009 (JP) .................................. 2009-181938

(51) Int. Cl.
*B32B 5/14* (2006.01)
*G02B 5/30* (2006.01)
*G02B 1/11* (2006.01)
*G02B 1/10* (2006.01)

(52) U.S. Cl.
CPC .............. *G02B 1/105* (2013.01); *G02B 5/3033* (2013.01); *G02B 1/11* (2013.01)
USPC ........... 428/217; 428/141; 428/142; 428/212; 428/310.5

(58) Field of Classification Search
USPC ....................... 428/141, 142, 212, 217, 310.5
See application file for complete search history.

(56) References Cited

U.S. PATENT DOCUMENTS

| 2009/0168168 A1 | 7/2009 | Nakashima et al. |
| 2009/0176077 A1* | 7/2009 | Horio et al. ................... 428/217 |
| 2009/0268299 A1 | 10/2009 | Furui et al. |
| 2009/0280317 A1 | 11/2009 | Nakashima et al. |

FOREIGN PATENT DOCUMENTS

| CN | 101341427 A | 1/2009 |
| CN | 101410247 A | 4/2009 |
| JP | 02-160543 A | 6/1990 |
| JP | 05-008350 A | 1/1993 |

(Continued)

*Primary Examiner* — Gerard Higgins
*Assistant Examiner* — Christopher Polley
(74) *Attorney, Agent, or Firm* — Novak Druce Connolly Bove & Quigg LLP (57) ABSTRACT

The present invention provides an inexpensive optical layered body which does not cause interference fringes but excels in hard coat properties, antistatic properties, and antireflection properties.

An optical layered body comprises: a light-transmitting substrate; and a hard coat layer (A) and a hard coat layer (B) on one face of the light-transmitting substrate in this order, wherein the hard coat layer (B) has a region (B1) not containing inorganic fine particles and a region (B2) containing inorganic fine particles, in this order from a portion adjacent to the hard coat layer (A), a boundary between the region (B1) not containing inorganic fine particles and the region (B2) containing inorganic fine particles has irregularities, and the inorganic fine particles have a particle size smaller than a visible light wavelength.

21 Claims, 1 Drawing Sheet

(56) References Cited

FOREIGN PATENT DOCUMENTS

| | | | |
|---|---|---|---|
| JP | 08197670 A | | 8/1996 |
| JP | 2000338308 A | * | 12/2000 |
| JP | 2002-036436 A | | 2/2002 |
| JP | 2005107005 A | * | 4/2005 |
| JP | 2007-025077 A | | 2/2007 |
| JP | 2009-114333 A | | 5/2009 |
| KN | 2009-134236 A | | 6/2009 |

* cited by examiner

OPTICAL LAYERED BODY, POLARIZER AND IMAGE DISPLAY DEVICE

CROSS-REFERENCE TO RELATED APPLICATIONS

This Application is a 35 U.S.C. 371 Application of International Application No. PCT/JP2010/061327, filed Jul. 2, 2010, claiming priority from Japanese Patent Application No. 2009-181938, filed Aug. 4, 2009, the entire contents of which are herein incorporated by reference.

TECHNICAL FIELD

The present invention relates to an optical layered body, a polarizer, and an image display device.

BACKGROUND ART

An optical layered body, which includes functional layers having various functions such as antiglare properties, antireflection properties, and antistatic properties, is provided on the outermost surfaces of image display devices such as cathode-ray tube (CRT) display devices, liquid crystal displays (LCD), plasma display panels (PDP), electroluminescence displays (ELD), and field emission displays (FED).

In order to impart hard coat properties to such an optical layered body, known is, for example, a method of forming a hard coat layer containing inorganic fine particles on a light-transmitting substrate (Patent Document 1).

In the case of producing a single such hard coat layer, it is necessary to make the hard coat layer thick. However, in the case of making the layer thick, the optical layered body is more likely to curl (warp). Thus, in the case of producing a polarizer by pasting the optical layered body on a polarizing element, pasting by rolling is difficult. In addition, the amount of the inorganic fine particles included in a thick hard coat layer is large, which therefore causes a cost disadvantage.

In contrast, an optical layered body with two hard coat layers is known (Patent Document 2). However, if inorganic fine particles are added to an upper layer (surface side) for the purpose of imparting hard coat properties with only a small amount of the inorganic fine particles, for example, a refractive-index difference between the upper layer and a lower layer arises. For this reason, in the case where a polarizer is formed using the optical layered body, interference fringes problematically occur and cause poor appearance.

Patent Document 1: JP-A Hei-2-160543
Patent Document 2: JP-A Hei-5-8350

DISCLOSURE OF THE INVENTION

Problems to be Solved by the Invention

In view of the above state of the art, an object of the present invention is to provide an inexpensive optical layered body which does not cause interference fringes but excels in hard coat properties, antistatic properties, and antireflection properties.

Means for Solving the Problems

The present invention relates to an optical layered body, comprising: a light-transmitting substrate; and a hard coat layer (A) and a hard coat layer (B) on one face of the light-transmitting substrate in this order, wherein the hard coat layer (B) has a region (B1) not containing inorganic fine particles and a region (B2) containing inorganic fine particles, in this order from a portion adjacent to the hard coat layer (A), a boundary between the region (B1) not containing inorganic fine particles and the region (B2) containing inorganic fine particles has irregularities, and the inorganic fine particles have a particle size smaller than a visible light wavelength.

Preferably, the region (B1) not containing inorganic fine particles contains a binder resin of the region (B2) containing inorganic fine particles as a main ingredient, and has an average thickness of a visible light wavelength or larger.

A binder resin of the hard coat layer (A) and a binder resin of the hard coat layer (B) are preferably compatible.

The hardness (Ha) of the hard coat layer (A), the hardness (Hb1) of the region (B1) not containing inorganic fine particles, and the hardness (Hb2) of the region (B2) containing inorganic fine particles preferably satisfy the following formula (1).

$$Ha \leq Hb1 < Hb2 \tag{1}$$

The inorganic fine particles preferably have a sequential beaded shape.

The inorganic fine particles are preferably conductive inorganic fine particles.

The hard coat layer (B) preferably contains 10 to 80% by mass of the inorganic fine particles.

The optical layered body of the present invention may further have a low refractive index layer on a face of the hard coat layer (B) opposite to the hard coat layer (A).

The optical layered body of the present invention may further have an antifouling layer on a face of the hard coat layer (B) opposite to the hard coat layer (A).

The present invention also relates to a polarizer including a polarizing element, wherein the polarizer includes the above optical layered body on a surface of the polarizing element.

The present invention also relates to an image display device, comprising: the above optical layered body or the above polarizer on the outermost surface.

Hereinafter, the present invention will be described in detail.

Figure 1:
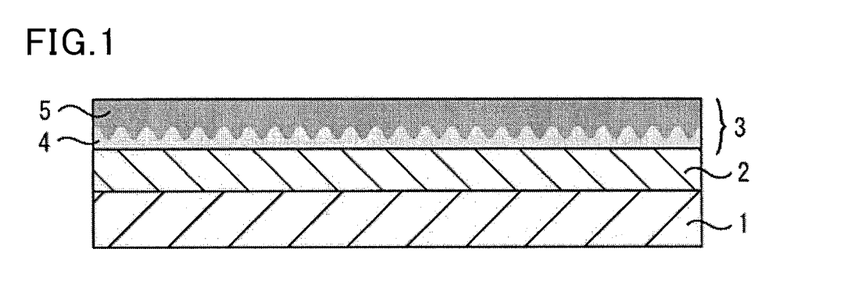
FIG. 1 is a view schematically illustrating one example of a cross section of an optical layered body according to the present invention.

FIG. 1 is a view schematically illustrating a cross section of an optical layered body according to the present invention. As illustrated in FIG. 1, the optical layered body of the present invention includes: a light-transmitting substrate 1; and a hard coat layer (A) 2 and a hard coat layer (B) 3 on one face of the light-transmitting substrate 1 in this order. The hard coat layer (B) 3 has a region (B1) 4 not containing inorganic fine particles and a region (B2) 5 containing inorganic fine particles.

Specifically, in the optical layered body of the present invention, the hard coat layer (B) 3 has a specific layer configuration of the region (B1) 4 not containing inorganic fine particles and the region (B2) 5 containing inorganic fine particles. For this reason, the optical layered body has a high hardness and excellent hard coat properties.

In addition, in the present invention, the region (B2) 5 containing inorganic fine particles has different hardness from the region (B1) 4 not containing inorganic fine particles and the hard coat layer (A) 2. Consequently, a layer having a low hardness functions as what is called a buffer layer, and the combination of this buffer layer and a layer having a high hardness can provide an optical layered body having better hard coat properties.

Further, in the optical layered body of the present invention, a boundary between the region (B1) 4 not containing inorganic fine particles and the region (B2) 5 containing inorganic fine particles has irregularities. For this reason, even if there is a refractive-index difference between the region (B1) 4 not containing inorganic fine particles and the region (B2) 5 containing inorganic fine particles, the irregularities prevent interference fringes. Further, even if interference fringes arise on an interface between the hard coat layer (A) 2 and the light-transmitting substrate 1 and/or the region (B1) 4 not containing inorganic fine particles, diffusion caused by the irregularities can reduce the interference fringes, and an optical layered body with good appearance can be produced.

Here, in the optical layered body of the present invention, the expression "a boundary between the region (B1) 4 not containing inorganic fine particles and the region (B2) 5 containing inorganic fine particles has irregularities" means that irregularities are observed on the boundary between the region (B1) 4 not containing inorganic fine particles and the region (B2) 5 containing inorganic fine particles in a cross section in a thickness direction of the optical layered body of the present invention.

The optical layered body of the present invention may produce interfaces between the light-transmitting substrate 1 and the hard coat layer (A) 2, and between the hard coat layer (A) 2 and the hard coat layer (B) 3. An interface occurs if the respective layers are not physically or chemically compatible. In particular, the refractive-index difference between layers may have a great influence, produce interference fringes, and cause poor appearance. In contrast, the optical layered body of the present invention, having the irregularities, can reduce interference fringes and have good appearance.

In addition, these irregularities are formed depending on the presence of inorganic fine particles, and there is no apparent interface between the region (B1) 4 not containing inorganic fine particles and the region (B2) 5 containing inorganic fine particles. In the irregularities, depressions include regions in which inorganic fine particles are dispersed in the binder resin, and projections only include the binder resin and do not include inorganic fine particles. Such irregularities do not cause a problem of stray light resulting from the presence of an interface, and enables production of a more preferable optical layered body. Since the boundary is due to the presence of inorganic fine particles, the boundary has a combination of both dots and lines, or has dots and does not form complete lines (interfaces) when the cross section of the hard coat layer (B) 3 is observed.

Further, in the present invention, a hard coat layer is divided into two layers, and only the region (B2) 5 containing inorganic fine particles contains inorganic fine particles. That is, the present invention contains the minimum amount of the inorganic fine particles in necessary portions, and is therefore advantageous also in terms of cost.

Hereinafter, the configuration of each component of the optical layered body of the present invention will be described in detail.

<Light-Transmitting Substrate>

The optical layered body of the present invention has a light-transmitting substrate.

The light-transmitting substrate is preferably a substrate having smoothness, heat resistance and excellent mechanical strength.

Specific examples of a material for the light-transmitting substrate include thermoplastic resins such as polyethylene terephthalate (PET), polyethylene naphthalate, polybutylene terephthalate, polybutylene naphthalate, triacetylcellulose (TAC), cellulose diacetate, cellulose acetate butylate, polyamide, polyimide, polyethersulfone, polysulfone, polypropylene (PP), cycloolefin polymer (COP), cycloolefin copolymer (COC), polymethylpentene, polyvinyl chloride, polyvinyl acetal, polyether ketone, polymethyl methacrylate, polycarbonate and polyurethane. Examples of preferable materials include polyethylene terephthalate and triacetylcellulose.

The thickness of the light-transmitting substrate is preferably 20 to 300 μm, and more preferably has a lower limit of 30 μm and an upper limit of 200 μm.

The light-transmitting substrate may be previously subjected to physical treatment such as corona discharge treatment, saponification, and oxidation treatment, or may be coated with a coating composition such as an anchor agent or a primer in order to improve the adhesion with the layer formed thereon.

<Hard Coat Layer (A)>

The optical layered body of the present invention has a hard coat layer (A) on the light-transmitting substrate.

The binder resin for forming the hard coat layer (A) is preferably transparent. Examples of the resin include an ionizing radiation-curable resin which is a resin to be cured with ultraviolet rays or electron beams, a mixture of the ionizing radiation-curable resin and a solvent-drying resin (a resin which forms a coat by only drying a solvent added in order to adjust a solid content upon applying the resin, such as a thermoplastic resin), and a thermosetting resin. The ionizing radiation-curable resin is more preferable. The "resin" used herein is a concept including resin components such as monomers and oligomers.

Examples of the ionizing radiation-curable resin include compounds having one or more unsaturated bonds such as compounds having acrylate functional groups. Examples of compounds having one unsaturated bond include ethyl (meth)acrylate, ethylhexyl (meth)acrylate, styrene, methylstyrene, and N-vinylpyrrolidone. Examples of compounds having two or more unsaturated bonds include polyfunctional compounds such as polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate; and reaction products of the polyfunctional compounds with (meth)acrylate (for example, a poly(meth)acrylate ester of polyhydric alcohol). The term "(meth)acrylate" used herein means methacrylate and acrylate.

A polyester resin, a polyether resin, an acrylic resin, an epoxy resin, a urethane resin, an alkyd resin, a spiroacetal resin, a polybutadiene resin, a polythiol-20, polyen resin, and the like, which have an unsaturated double bond and a relatively low molecular weight, can also be used as the ionizing radiation-curable resin.

The ionizing radiation-curable resin may be used in combination with a solvent-drying resin. Use of the solvent-drying resin in combination efficiently prevents coating defects of the application surface and accordingly, better gloss blackness can be obtained. The solvent-drying resin that can be used in combination with the above-mentioned ionizing radiation-curable resin is not particularly limited and in general, a thermoplastic resin can be used.

The thermoplastic resin is not particularly limited. Examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins and rubbers or elastomers. The thermoplastic resin is preferably non-crystalline and soluble in organic solvents (particularly, a common solvent in which a plurality of polymers or curable compounds can be dissolved), is preferably used. Particularly, styrene resins, (meth)acrylic resins, alicyclic olefin resins, polyester resins, and cellulose derivatives (e.g. cellulose esters) and the like are preferable because they are superior in film forming properties, transparency, and weather resistance.

In the optical layered body according to the present invention, when a material of the light-transmitting substrate is a cellulose resin such as triacetyl cellulose (TAC), preferable specific examples of the thermoplastic resin include cellulose resins including cellulose derivatives such as nitrocellulose, acetyl cellulose, cellulose acetate propionate, ethyl hydroxyethyl cellulose, cellulose acetate butyrate, ethyl cellulose, and methyl cellulose. Use of the cellulose resin enables to improve the adhesion to the light-transmitting substrate and the hard coat layer, and transparency.

Furthermore, besides the cellulose resins, examples of the thermoplastic resin include vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resins and copolymers thereof, and methacrylic resins and copolymers thereof, polystyrene resins, polyamide resins, and polycarbonate resins.

Examples of the thermosetting resin include phenolic resins, urea resins, diallylphthalate resins, mylamine resins, guanamine resins, unsaturated polyester resins, polyurethane resins, epoxy resins, aminoalkyd resins, melamine-urea copolycondensation resins, silicon resins, and polysiloxane resins.

The hard coat layer (A) may include other ingredients as required in addition to the binder resin. Examples of the above-mentioned other ingredients include photopolymerization initiators, leveling agents, crosslinking agents, hardening agents, polymerization accelerators, ultraviolet absorbents, shock absorbers, viscosity adjustment agents, and organic antistatic agents.

The hard coat layer (A) can be formed with a composition for a hard coat layer (A) prepared by uniformly mixing the binder resin, other ingredients, and a solvent.

The mixing may be performed with a known apparatus such as a paint shaker, a beads mill, or a kneader.

Examples of the solvent include water, alcohols (for example, methanol, ethanol, propanol, isopropanol, n-butanol, s-butanol, t-butanol, benzyl alcohol, and PGME), ketones (for example, acetone, methyl ethyl ketone, methyl isobutyl ketone, cyclopentanone, cyclohexanone, heptanone, diisobutyl ketone, and diethyl ketone), esters (for example, methyl acetate, ethyl acetate, propyl acetate, butyl acetate, methyl formate, ethyl formate, propyl formate, butyl formate, and PGMEA), aliphatic hydrocarbons (for example, hexane and cyclohexane), halogenated hydrocarbons (for example, methylene chloride, chloroform, and carbon tetrachloride), aromatic hydrocarbons (for example, benzene, toluene, and xylene), amides (for example, dimethylformamide, dimethylacetamide, and n-methylpyrrolidone), ethers (for example, diethyl ether, dioxane, and tetrahydrofuran), and ether alcohols (for example, 1-methoxy-2-propanol).

The solvent used for the composition for a hard coat layer (A) is preferably a penetrating solvent.

The penetrating solvent is a solvent that can exhibit wettability and swelling properties to a light-transmitting substrate to which a composition containing the solvent is applied, or a solvent that can permeate into the light-transmitting substrate. The penetrating solvent can substantially eliminate the interface between the light-transmitting substrate and the hard coat layer (A), and therefore can improve adhesion between layers and suppress interference fringes.

Examples of the penetrating solvent in the case where a triacetylcellulose (TAC) substrate is used as the light-transmitting substrate include: ketones such as acetone, methyl ethyl ketone, cyclohexanone, methyl isobutyl ketone, and diacetone alcohol; esters such as methyl formate, methyl acetate, ethyl acetate, butyl acetate, and ethyl lactate; nitrogen-containing compounds such as nitromethane, acetonitrile, N-methylpyrrolidone, N,N-dimethyl formamide; glycols such as methyl glycol and methyl glycol acetate; ethers such as tetrahydrofuran, 1,4-dioxane, dioxolane, and diisopropyl ether; halogenated hydrocarbons such as methylene chloride, chloroform, and tetrachloroethane; glycol ethers such as methyl cellosolve, ethyl cellosolve, butyl cellosolve, and cellosolve acetate; dimethyl sulfoxide; propylene carbonate; and a mixture of these. Of these, preferable is at least one selected from the group consisting of methyl acetate, ethyl acetate, butyl acetate, methyl ethyl ketone, methyl isobutyl ketone, and cyclohexanone.

A method of forming the hard coat layer (A) may be a known method. For example, the layer may be formed by the method including applying the composition for a hard coat layer (A) to the light-transmitting substrate to form a coat, drying the coat if necessary, and thereafter curing the coat.

As the method of forming a coat, usable are, for example, known various methods such as a spin coating method, a dip coating method, a spray coating method, a die coating method, a bar coating method, a roller coating method, a meniscus coating method, a flexography method, a screen printing method, and a bead coating method.

A method of curing the coat may be appropriately selected in accordance with the contents and the like of the composition. For example, if the composition is ultraviolet-curable, the coat may be cured by UV irradiation.

The hard coat layer (A) preferably has a thickness of 1 to 10 µm. A thickness of less than 1 µm may cause insufficient hard coat properties of the optical layered body of the present invention. A thickness exceeding 10 µm may cause rough curling and difficult polarizer processing. The thickness is more preferably 2 to 8 µm.

Here, the thickness is a value obtainable by observing a cross section of the optical layered body with an electron microscope (SEM, TEM, or STEM) and measuring the thickness.

<Hard Coat Layer (B)>

The optical layered body of the present invention has a hard coat layer (B) on the hard coat layer (A).

The hard coat layer (B) has a region (B1) not containing inorganic fine particles and a region (B2) containing inorganic fine particles, in this order from a portion adjacent to the hard coat layer (A).

In the optical layered body of the present invention, the region (B2) containing inorganic fine particles is located on the surface side (a side opposite to the light-transmitting substrate). Therefore, the optical layered body has a high hardness and excellent hard coat properties. The region (B1) not containing inorganic fine particles is a region having a lower hardness than the region (B2) containing inorganic fine particles, and thus functions as what is called a buffer region. Therefore, the region (B1) not containing inorganic fine particles can prevent the optical layered body from curling (warping), buffer the force applied externally to the optical layered body, and improve hard coat properties.

Further, in the hard coat layer (B), the boundary between the region (B1) not containing inorganic fine particles and the region (B2) containing inorganic fine particles has irregularities. The irregularities can prevent interference fringes caused by the refractive-index difference between the region (B1) not containing inorganic fine particles and the region (B2) containing inorganic fine particles. In addition, since there is no interface between the region (B1) not containing inorganic fine particles and the region (B2) containing inorganic fine particles, contrast reduction due to reflection and generation of stray light can also be prevented.

The region (B1) not containing inorganic fine particles is a layer located between the hard coat layer (A) and the region (B2) containing inorganic fine particles.

The region (B1) not containing inorganic fine particles is a layer not containing inorganic fine particles. Desired effects of the present invention can be exerted by the specific configuration which has the region (B1) not containing inorganic fine particles and the region (B2) containing inorganic fine particles mentioned later.

The region (B1) not containing inorganic fine particles preferably mainly contains the binder resin of the region (B2) containing inorganic fine particles.

The region (B1) not containing inorganic fine particles preferably has an average thickness of a visible light wavelength or larger. An average thickness of smaller than a visible light wavelength may cause failure in suppressing interference fringes.

Specifically, the average thickness of the region (B1) not containing inorganic fine particles is preferably 500 nm or more. An average thickness of less than 500 nm may cause failure in suppressing interference fringes.

Here, the region (B1) not containing inorganic fine particles includes irregularities depending on the presence of the inorganic fine particles contained in the region (B2) containing inorganic fine particles. For this reason, the average thickness of the region (B1) not containing inorganic fine particles refers to an average of values obtainable by observing a cross section in a thickness direction of the optical layered body with an electron microscope (SEM, TEM, or STEM) and measuring the average by setting, in a constant range, the distance between the interface between the hard coat layer (A) and the hard coat layer (B) and the top of the projection or the bottom of the depression.

The projections of the irregularities are preferably apart from each other at intervals of a visible light wavelength or larger. This is because if the projections are at intervals of a visible light wavelength or larger, light entering the irregularities is appropriately scattered, and the irregularities can prevent interference fringes.

The region (B2) containing inorganic fine particles contains inorganic fine particles.

The region (B2) containing inorganic fine particles including the inorganic fine particles has a higher hardness than the region not containing inorganic fine particles (B1) and the hard coat layer (A). In the case of positioning such a region (B2) containing inorganic fine particles closer to the surface side, higher hardness of the surface of the optical layered body is provided and thus higher abrasion resistance is achieved. Since the optical layered body of the present invention is formed by the combination of layers with different hardnesses, it is excellent in hard coat properties.

The inorganic fine particles have a particle size smaller than a visible light wavelength. This is because the inorganic fine particles having a particle size of a visible light wavelength or larger cause low transparency. Specifically, the inorganic fine particles more preferably have an average primary particle size of 1 to 200 nm. An average primary particle size of smaller than 1 nm may cause insufficient hardness. An average primary particle size of more than 200 nm may increase a haze value. The average primary particle size is further preferably 5 to 150 nm.

Here, the average primary particle size is a value obtainable by observing a cross section of the optical layered body according to the present invention with an electron microscope (SEM, TEM, or STEM) and measuring the size.

In the configuration in which a low-refractive-index antireflection layer is further laminated on a face opposite to the light-transmitting substrate side of the region (B2) containing inorganic fine particles in the optical layered body, the inorganic fine particles preferably have a high refractive index. This is because in the case that a low refractive index layer mentioned later is formed, such inorganic fine particles can provide sufficiently large refractive index difference with the low refractive index layer, and thus antireflection effects due to the low refractive index layer can be further exerted.

In the configuration in which a low refractive-index antireflection layer is not further laminated on a face opposite to the light-transmitting substrate side of the region (B2) containing inorganic fine particles in the optical layered body, the inorganic fine particles preferably have a refractive index lower than the binder resin. This is because surface reflectance can be lowered and an optical layered body with good visibility can be obtained even if a low refractive index layer is not separately formed in the optical layered body.

Irrespective of the presence of the low refractive-index antireflection layer mentioned above, a refractive-index difference is preferably present between the inorganic fine particles and binder resin. This is because a refractive-index difference arises between the region (B2) containing inorganic fine particles and the region (B1) not containing inorganic fine particles, and the interference spots produced on the interface between the light-transmitting substrate and/or region (B1) not containing inorganic fine particles and the hard coat layer (A) can be reduced.

The inorganic fine particles having a suitable refractive index may be appropriately selected according to the desired embodiments, and in general, the refractive index thereof is preferably 1.2 to 3.5. The inorganic fine particles having a refractive index of 1.2 to 1.5 enables the hard coat layer (B) to have a lower refractive index. Therefore, an optical layered body with good visibility can be obtained without a low refractive index layer provided separately.

In the case where a low refractive index layer mentioned later is formed, the inorganic fine particles preferably have a refractive index of 1.5 to 3.5 in order to give higher antireflection effects.

The inorganic fine particles may be known inorganic fine particles as long as they can impart a sufficient hardness to the region (B2) containing inorganic fine particles. In the optical layered body of the present invention, the inorganic fine particles are preferably conductive inorganic fine particles because antistatic properties can be imparted to the optical layered body of the present invention.

Specific examples of the inorganic fine particles include $SiO_2$ (refractive index: 1.20 to 1.45, including all the shapes such as a porous shape and a hollow shape), MgF (refractive index: 1.38), ZnO (refractive index: 1.90, hereinafter, all the values in the following parentheses represent refractive indices), $Sb_2O_2$ (1.71), $SnO_2$ (1.997), $CeO_2$ (1.95), indium tin oxide (abbreviated as ITO; 1.95), $In_2O_3$ (2.00), $Al_2O_3$ (1.63 to 1.76), antimony doped tin oxide (abbreviated as ATO; 2.0), aluminum doped zinc oxide (abbreviated as AZO; 2.0), and $TiO_2$ (rutile type: 2.71). Of these inorganic fine particles, ATO or $SnO_2$ is preferable for the purpose of suitably imparting antistatic properties, a refractive index, and hardness to the optical layered body.

The inorganic fine particles may be monodisperse, and are more preferably sequential beaded. The sequential beaded inorganic fine particles, even in a small amount, can suitably impart hard coat properties and the above antistatic properties, and are not likely to reduce the light transmittance of the optical layered body. Further, the sequential sequential beaded inorganic fine particles enable the region (B1) not containing inorganic fine particles and region (B2) containing inorganic fine particles to be suitably formed in the hard coat layer (B). This will be described later.

Here, the "sequential beaded shape", like a shape of pearl necklace, means a shape in which 3 to 100 pieces of the inorganic fine particles are connected, and the term "connected" means the inorganic fine particles may be linear or branched.

The inorganic fine particles may be subjected to organic treatment. Treatment with an organic material having a reactive group is particularly preferable because it reacts with a binder resin and is crosslinked to improve the hard coat performance.

The above-mentioned organic treatment may be a method of chemically bonding a compound to the surfaces of the inorganic fine particles or a physical method of impregnating voids of the composition forming inorganic fine particles with the material without chemical bonds to the surfaces of the inorganic fine particles; and both may be employed.

In general, as the organic treatment, a chemical treatment method using active groups on silica surface such as hydroxyl groups or silanol groups is preferably employed in terms of the treatment efficiency. The compounds to be used for the treatment may be silane, siloxane, and silazane materials having high reactivity with the above-mentioned active groups. Examples include straight chain alkyl monosubstituted silicone materials such as methyltrichlorosilane, branched alkyl monosubstituted silicone materials, or polysubstituted straight chain alkylsilicone compounds such as di-n-butyldichlorosilane, and ethyldimethylchlorosilane, and polysubstituted branched chain alkyl silicone compounds. Similarly, straight chain alkyl group or branched alkyl group monosubstituted or polysubstituted siloxane materials and silazane materials can also be effectively used.

In accordance with necessary functions, those having hetero atoms, unsaturated bond groups, cyclic bond groups, aromatic functional groups or the like at the terminal or intermediate position of the alkyl chains may be used.

The hard coat layer (B) preferably contains 10 to 80% by mass of the inorganic fine particles. An amount of less than 10% by mass may deteriorate hard coat properties of the optical layered body according to the present invention. An amount exceeding 80% by mass may deteriorate the transparency and hardness of a layer containing inorganic fine particles. The amount is more preferably 15 to 60% by mass.

The hard coat layer (B) which has the region (B1) not containing inorganic fine particles and the region (B2) containing inorganic fine particles can be formed by using a composition for a hard coat layer (B) containing a binder resin and the inorganic fine particles.

The binder resin for forming the hard coat layer (B), may be the same resin as the resin for forming the hard coat layer (A) mentioned above. Particularly preferable as the binder resin for forming the hard coat layer (B) is a resin compatible with the binder resin of the hard coat layer (A). The same resin as the resin for forming the hard coat layer (A) is particularly preferable because it improves the adhesion and obscures an interface causing interference fringes. In the case where the binder resin of the hard coat layer (B) is the same as the binder resin of the hard coat layer (A), the hardness of the region (B1) not containing inorganic fine particles is substantially equal to the hardness of the hard coat layer (A). In addition, both the region (B1) not containing inorganic fine particles and the hard coat layer (A) function as buffer regions, and it is possible to provide an optical layered body excellent in hard coat properties.

The composition for a hard coat layer (B) can be prepared by mixing, with a solvent, the binder resin for forming a hard coat layer (B), the inorganic fine particles, and if necessary other ingredients.

As the above other ingredients and solvent, there may be mentioned the same other ingredients and solvent usable for the composition for a hard coat layer (A). In order to improve antistatic properties, an organic antistatic agent, as well as the inorganic conductive fine particles, may be added.

As the preparation method by mixing, there may be mentioned the same method as the method of preparing the composition for a hard coat layer (A).

The hard coat layer (B) can be formed by applying the composition for a hard coat layer (B) to the hard cot layer (A) so as to give a web speed and an application speed different from each other and thereby impart shear force, thereby forming a coat, and drying and curing the coat.

Here, in the composition for a hard coat layer (B), the inorganic fine particles are uniformly dispersed. However, inorganic fine particles are separated so that a boundary between the region (B1) not containing inorganic fine particles and the region (B2) containing inorganic fine particles has irregularities in the cured hard coat layer (B). This is presumably because the shear stress applied between the coat and the hard coat layer (A) upon formation of the coat allows inorganic fine particles to move from the vicinity of the interface on the hard coat layer (A) side to the interface on the other side. As the coat in such a state is dried and cured, a hard coat layer (B) which has the region (B1) not containing inorganic fine particles and the region (B2) containing inorganic fine particles is presumably formed. As the composition, application speed, drying method, and the like of the composition for a hard coat layer (B) are adjusted, the thickness and irregularities of the region (B1) not containing inorganic fine particles to be formed is adjusted.

As other methods of forming the hard coat layer (B), there may be mentioned, for example, a method including: applying the composition for a hard coat layer (B) onto a mold-releasable substrate; drying the applied composition in a manner that the convention is caused due to the difference in the specific gravity of the inorganic fine particles in the coating liquid, so that irregularities are formed on a boundary between the region (B1) not containing inorganic fine particles and the region (B2) containing inorganic fine particles; forming a hard coat layer (B) by curing the coat; forming a hard coat layer (A) on the hard coat layer (B); and transferring the face of the hard coat layer (A) to the substrate. In the case of curing the hard coat layer (B), if it is preferably semi-cured because the adhesion with the hard coat layer (A) is improved and an interface is less likely to occur between the hard coat layers.

The method of applying the composition for a hard coat layer (B) is not particularly limited as long as it can apply a predetermined shear force to a coat, and may be the same method as the application method in the formation of the hard coat layer (A).

The application amount is preferably 1.5 to 15 g/cm$^2$.

A usual drying method is used as the drying method. Specifically, drying is performed by blowing or dwelling hot air with 40° C. to 150° C. for a predetermined period of time.

The method of curing the coat may be the same method as the method of curing the hard coat layer (A).

Formation of a hard coat layer (B) by such a method enables to form a hard coat layer (B) which has the region (B1) not containing inorganic fine particles and the region (B2) containing inorganic fine particles.

The hard coat layer (B) preferably has a thickness of 1 to 10 µm. A thickness of less than 1 µm may cause insufficient hard coat properties. A thickness exceeding 10 µm may cause rough curling and difficult polarizer processing. The thickness is more preferably 2 to 8 µm.

The thickness is a value obtainable by observing a cross section of the optical layered body with an electron microscope (SEM, TEM, or STEM) and measuring the thickness.

In the optical layered body of the present invention, the hardness (Ha) of the hard coat layer (A), the hardness (Hb1) of the region (B1) not containing inorganic fine particles, and the hardness (Hb2) of region (B2) containing inorganic fine particles preferably satisfy the following formula.

$$Ha \leq Hb1 < Hb2 \qquad (1)$$

When the formula is satisfied, a hardness suitable as the optical layered body can be secured, and curling and the like deformations can be prevented.

The hardnesses of the hard coat layer (A), the region (B1) not containing inorganic fine particles, and the region (B2) containing inorganic fine particles can be determined with a surface coating physical property tester (Picodenter HM500) produced by H. Fischer. by using films independently formed with a composition containing ingredients for forming each layer and region.

<Low Refractive Index Layer>

The optical layered body preferably further includes a low refractive index layer.

Formation of the low refractive index layer can provide an optical layered body excellent in antireflection properties.

The low refractive index layer preferably has a refractive index lower than those of the hard coat layers (A) and (B). According to a preferred embodiment of the present invention, the hard coat layers (A) and (B) each preferably have a refractive index of 1.5 or higher, and the low refractive index layer preferably has a refractive index of lower than 1.5. The low refractive index layer more preferably has a refractive index of 1.45 or lower, and further preferably 1.35 or lower.

The low refractive index layer may be composed of any of 1) a resin containing silica or magnesium fluoride, 2) a fluorine material, which is a low refractive index resin, 3) a fluorine material containing silica or magnesium fluoride, and 4) a thin film of silica or magnesium fluoride.

The fluorine material is a polymerizable compound containing fluorine atoms at least in a molecule or a polymer thereof. The polymerizable compound is not particularly limited, and for example, a polymerizable compound having a curable and reactive group such as a functional group curable by ionizing radiation (an ionizing radiation-curable functional group) or a polar group curable by heat (a heat-curable polar group) is preferable. Further, compounds having these reactive groups may also be used.

As fluorine atom-containing polymerizable compounds having an ionizing radiation-curable group, fluorine-containing monomers having an ethylenic unsaturated bond can be widely employed. More specifically, fluoroolefins (for example, fluoroethylene, vinylidene fluoride, tetrafluoroethylene, hexafluoropropylene, perfluorobutadiene, and perfluoro-2,2-dimethyl-1,3-dioxole) can be exemplified. Examples of polymerizable compounds having a (meth)acryloyloxy group include (meth)acrylate compounds containing a fluorine atom in a molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethylmethacrylate and α-trifluoroethylmethacrylate; and fluorine-containing polyfunctional (meth)acrylic acid ester compounds having a $C_{1-14}$ fluoroalkyl group, a fluorocycloalkyl group or a fluoroalkylene group, which have at least three fluorine atoms, and at least two (meth)acryloyloxy groups in a molecule.

Examples of the fluorine atom-containing polymerizable compounds having a heat-curable polar group include a 4-fluoroethylene-perfluoroalkylvinylether copolymer; fluoroethylene-hydrocarbonvinylether copolymer; and fluorine modified products of various resins such as epoxy, polyurethane, cellulose, phenol and polyimide. Preferable examples of the heat-curable polar group include groups to form a hydrogen bond such as a hydroxyl group, a carboxyl group, an amino group, and an epoxy group. These groups are superior in not only the adhesion to a coat but also the affinity for inorganic ultra fine particles such as silica.

Examples of the polymerizable compounds (fluororesins) having the ionizing radiation-curable group and the heat-curable polar group together include partially and fully fluorinated alkyl, alkenyl or aryl esters of acrylic acid or methacrylic acid, fully or partially fluorinated vinyl ethers, fully or partially fluorinated vinyl esters, and fully or partially fluorinated vinyl ketones.

Examples of polymers of the fluorine atom-containing polymerizable compounds include polymers of a monomer or a mixture of monomers, containing at least one fluorine-containing (meth)acrylate compound of the polymerizable compounds having the ionizing radiation-curable group; copolymers of at least one of the fluorine-containing (meth)acrylate compounds described above and a (meth)acrylate compound not containing a fluorine atom in a molecule such as methyl (meth)acrylate, ethyl (meth)acrylate, propyl (meth)acrylate, butyl (meth)acrylate and 2-ethylhexyl (meth)acrylate; and monopolymers or copolymers of fluorine-containing monomers such as fluoroethylene, vinylidene fluoride, trifluoroethylene, chloro-trifluoroethylene, 3,3,3-trifluoropropylene, 1,1,2-trichloro-3,3,3-trifluoropropylene and hexafluoropropylene.

Silicone-containing vinylidene fluoride copolymers formed by adding a silicone component to the above copolymers can also be used as polymers of the fluorine atom-containing polymerizable compounds. Examples of the silicone component in this case include (poly)dimethylsiloxane, (poly)diethylsiloxane, (poly)diphenylsiloxane, (poly)methylphenylsiloxane, alkyl modified (poly)dimethylsiloxane, azo group-containing (poly)dimethylsiloxane, dimethylsilicone, phenylmethylsilicone, alkyl-aralkyl modified silicone, fluorosilicone, polyether modified silicone, fatty acid ester modified silicone, methyl hydrogen silicone, silanol group-containing silicone, alkoxy group-containing silicone, phenol group-containing silicone, methacryl modified silicone, acryl modified silicone, amino modified silicone, carboxylic acid modified silicone, carbinol modified silicone, epoxy modified silicone, mercapto modified silicone, fluorine modified silicone, and polyether modified silicone. Among them, silicone components having a dimethylsiloxane structure are preferable.

Besides the above examples, examples of the fluororesins include compounds obtained by reacting a fluorine-containing compound having at least one isocyanate group in a molecule with a compound having at least one functional group, such as an amino group, a hydroxyl group, or a carboxyl group, which reacts with an isocyanate group in a molecule; compounds obtained by reacting fluorine-containing polyols such as fluorine-containing polyether polyols, fluorine-containing alkyl polyols, fluorine-containing polyester polyols, and fluorine-containing ε-caprolactone modified polyols with a compound having an isocyanate group; and the like.

The low refractive index layer can be formed by using a composition containing, for example, raw material components (a composition for a refractive index layer). More specifically, a solution or a dispersion obtained by dissolving or dispersing the raw material components (such as resins) and, based on necessity, additives (e.g. "fine particles having voids" described below, a polymerization initiator, an antistatic agent, an antifouling agent, an antiglare agent, and the like) in a solvent is used as a composition for a low refractive index layer, a coat is formed using the composition, and the coat is cured to form the low refractive index layer. Additionally, the additives such as a polymerization initiator, an antistatic agent, an antifouling agent, an antiglare agent, and the like may be conventionally known ones. Use of the organic antistatic agent can impart the antistatic performance.

The solvent may be the same as that used in the formation of the hard coat layer (A). Preferable are methyl isobutyl ketone (MIBK), methyl ethyl ketone (MEK), isopropyl alcohol (IPA), n-butanol, s-butanol, t-butanol, propylene glycol monomethyl ether (PGME), and propylene glycol monomethyl ether acetate (PGMEA).

A method for preparing the above-mentioned composition may be any method as long as the components are evenly mixed, and a known method may be employed. Mixing and dispersion may be carried out using, for example, the known apparatus described in the hard coat layer formation.

A method for forming the low refractive index layer may be carried out in accordance with a known method. For example, various methods described in the hard coat layer formation may be employed.

In the low refractive index layer, "fine particles having voids" are preferably used as a low refractive index agent. The "fine particles having voids" can reduce the refractive index of the low refractive index layer while maintaining the layer strength of the low refractive index layer. The term "fine particles having voids" used herein means particles having a structure in which the inside of the particle is filled with vapor and/or a porous structure including vapor is formed, and a characteristic that the refractive index is decreased in inverse proportion to a proportion of the vapor in the particle compared with the particle's own refractive index. Further, in the present invention, the particle having voids includes a fine particle, in which a nano porous structure can be formed inside the coat and/or in at least a part of the coat surface, based on the state, the structure and the agglomerated state of the fine particles and the dispersed state of the fine particles inside the coat. The refractive index of the low refractive index layer using this fine particle can be adjusted to a refractive index of 1.25 to 1.45.

Examples of the inorganic fine particles having voids include silica fine particles produced by a method described in JP-A 2001-233611. Further, silica particles obtained by production methods described in documents such as JP-A Hei-7-133105, JP-A 2002-79616, and JP-A 2006-106714, may be used. The silica fine particles having voids are easily produced and have high particle's own hardness. Thus, if the particles are mixed with a binder to form a low refractive index layer, they improve the layer strength and enable to adjust the refractive index within about 1.20 to 1.45. Particularly, specific preferable examples of organic fine particles having voids include hollow polymer fine particles prepared by a technique disclosed in JP-A 2002-80503.

Examples of the fine particles, in which a nano porous structure can be formed inside the coat and/or on at least a part of the coat surface, include, in addition to the silica particles previously described, a slow-release agent which is produced for the purpose of increasing a specific surface area, and which allows various chemical substances to be adsorbed on a column for filling and a porous portion of the surface, porous particles used for fixing a catalyst, and dispersed substances or agglomerated substances of hollow particles for the purpose of being incorporated in a heat insulating material or a low dielectric material. Specific examples thereof (to be used) include commercially available particles having a particle size within the preferable range of the present invention, such as agglomerated substances of porous silica fine particles selected from Nipsil and Nipgel (trade names) produced by Nihon Silica Kogyo Co., Ltd., and colloidal silica UP series (trade name) produced by Nissan Chemical Industries, Ltd., in which silica fine particles are linked with one another in a chain form.

The average particle size of the "fine particles having voids" is preferably 5 nm or greater and 300 nm or smaller, and more preferably, the lower limit is 5 nm and the upper limit is 100 nm, and further preferably, the lower limit is 10 nm and the upper limit is 80 nm. An average particle size within the range can impart excellent transparency to the low refractive index layer. Here, the average particle size is a value measured by a dynamic light-scattering method. The amount of the "fine particles having voids" may be usually about 0.1 to 500 parts by mass, and preferably about 10 to 200 parts by mass with respect to 100 parts by mass of the matrix resin in the above low refractive index layer.

In forming the low refractive index layer, the viscosity of the composition for a low refractive index layer is preferably in a range of 0.5 to 5 cps (25° C.) where preferable application properties are attained, and more preferably in a range of 0.7 to 3 cps (25° C.). The viscosity in the above range can provide an excellent antireflection coat for visible light, and enables formation of a uniform thin coat without producing irregularity of application, and formation of a low refractive index layer having particularly excellent adhesion to the substrate.

Curing means of resins may be the same as the method described in the above hard coat layer. In the case of using light irradiation means for curing treatment, for example, it is preferable to add a photopolymerization initiator for starting polymerization of a polymerizable compound by generating radicals with light irradiation, to a fluororesin composition.

A layer thickness (nm) $d_A$ of the low refractive index layer preferably satisfies the following formula (I):

$$d_A = m\lambda/(4n_A) \qquad (I),$$

wherein $n_A$ represents a refractive index of the low refractive index layer, m represents a positive odd and preferably 1, and λ is a wavelength and preferably a value from 480 to 580 nm.

Further, in the present invention, the low refractive index layer preferably satisfies the following formula (II):

$$120 < n_A d_A < 145 \qquad (II)$$

for lower reflectance.

<Other Layers>

The optical layered body may have an optional layer, in addition to the light-transmitting substrate, the hard coat layers (A) and (B), and the low refractive index layer. Examples of the optional layer include an antiglare layer, an antifouling layer, a high refractive index layer, a medium refractive index layer, and an antistatic layer. These layers may be formed by a known method by mixing known antiglare agents, low refractive index agents, high refractive index agents, antistatic agents, antifouling agents, or the like with resins, solvents, or the like. In particular, an antifouling layer is preferably further formed.

<Optical Layered Body>

The optical layered body of the present invention preferably has a hardness of 2H to 5H in a pencil hardness test (load: 4.9 N) in conformity with JIS K5600-5-4 (1999).

The optical layered body of the present invention preferably has a surface resistance of $10^{11}\Omega/\square$ or less.

If the surface resistance exceeds $10^{11}\Omega/\square$, the target antistatic performance may not be exhibited. The surface resistance is more preferably $10^{9}\Omega/\square$ or less.

The surface resistance can be determined with a surface resistance measuring device (Mitsubishi Chemical Corporation, product number: Hiresta IPMCP-HT260).

The optical layered body of the present invention preferably has a total light transmittance of 80% or higher. If it is lower than 80% and the optical layered body is mounted on the display surface, color reproducibility and visibility may be impaired. The total light transmittance is more preferably 85% or higher, and further preferably 90% or higher.

The total light transmittance can be determined by a method in conformity with JIS K-7361 using a haze meter (Murakami Color Research Laboratory Co., Ltd., product number: HM-150).

Examples of the method for producing the optical layered body of the present invention include a method including forming a hard coat layer (A) on one surface of the light-transmitting substrate, and thereafter forming a hard coat layer (B) on the hard coat layer (A).

The method of forming the hard coat layer (A) and the method of forming the hard coat layer (B) are as described above.

<Polarizer and Image Display Device>

A polarizer can be formed by providing the optical layered body on the surface of a polarizing element such that the face opposite to the side of the hard coat layer faces the polarizing element. Such a polarizer is also one aspect of the present invention.

The polarizing element is not particularly limited, and for example, a polyvinyl alcohol film, a polyvinyl formal film, a polyvinyl acetal film or an ethylene-vinyl acetate copolymer saponified film, which are dyed with iodine or the like and stretched, can be used. In the lamination treatment of the polarizing element and the optical layered body, the light-transmitting substrate is preferably subjected to a saponification treatment. The saponification treatment makes the adhesion good, and provides antistatic effects. An adhesive may be used for bonding. Examples of the adhesive include an acrylic adhesive, a urethane adhesive, a silicone adhesive, or a water adhesive.

The optical layered body and the polarizer according to the present invention can be provided on the outermost surface of image display device. Such an image display device is also one aspect of the present invention.

The image display device may be a non-selfluminous image display device such as LCD, or may be a selfluminous image display device such as PDP, FED, ELD (organic EL and inorganic EL), or CRT.

The LCD, which is a typical example of the above non-selfluminous type device, includes a light-transmitting display body and a light source apparatus for irradiating the light-transmitting display from the backside. When the image display device of the present invention is the LCD, the optical layered body or the polarizer is formed on the surface of this light-transmitting display body.

In the case of a liquid crystal display device having the optical layered body of the present invention, a light source of the light source apparatus is applied from the light-transmitting substrate side of the optical layered body. Here, in a liquid crystal display device of an STN mode, a VA mode, and an IPS mode, a retardation plate may be inserted between a liquid crystal display element and the polarizer. An adhesive layer may be provided between each of the layers of this liquid crystal display device as required.

The PDP, which is a selfluminous image display device, includes a surface glass substrate (an electrode is forted on the surface), and a backside glass substrate (an electrode and minute grooves are formed on the surface and fluorescent layers of red, green and blue are formed in the grooves) which is located at a position opposite to the surface glass substrate with a discharge gas filled between these substrates. When the image display device of the present invention is the PDP, the PDP includes the optical layered body described above on the surface of the surface glass substrate or a front plate (glass substrate or film substrate) thereof.

The above selfluminous image display device may be an ELD apparatus in which luminous substances such as zinc sulfide or diamines materials which emit light through the application of a voltage are vapor-deposited on a glass substrate and display is performed by controlling a voltage to be applied to the substrate, or image display devices such as a CRT, which converts electric signals to light to generate visible images. In this case, the image display device includes the optical layered body described above on the outermost surface of each of the display devices or on the surface of a front plate thereof.

Any of the optical layered bodies of the present invention can be used for displays such as televisions, computers, and word processors. Particularly, it can be suitably used for the surfaces of displays for high-resolution images such as CRTs, liquid crystal panels, PDPs, ELDs and FEDs.

Effects of the Invention

The optical layered body of the present invention, having the above configuration, excels in hard coat properties, and can prevent interference fringes. Therefore, the optical layered body of the invention is preferably applicable to cathode-ray tube (CRT) display devices, liquid crystal displays (LCD), plasma display panels (PDP), electroluminescent displays (ELD), field emission displays (FED), and the like.

MODES FOR CARRYING OUT THE INVENTION

The present invention will be described in further detail by way of examples and comparative examples. The present invention is not limited only to these examples and comparative examples.

The terms "part(s)" and "%" are in compliance with the mass standard, unless otherwise specified.

Example 1

A composition for a hard coat layer (A) and a composition for a hard coat layer (B) were prepared by blending ingredients in the following composition.

(Composition for Hard Coat Layer (A))
  Pentaerythritol triacrylate (PETA): 30 parts by mass
  IPDI skeleton urethane acrylate (product name: purple light 1700B, produced by The Nippon Synthetic Chemical Industry Co., Ltd.): 20 parts by mass
  Irgacure 184 (produced by CIBA JAPAN K.K.): 4 parts by mass
  Methyl ethyl ketone (MEK): 50 parts by mass
(Composition for Hard Coat Layer (B))
  Pentaerythritol triacrylate (ETTA): 25 parts by mass
  IPDI skeleton urethane acrylate (product name: purple light 1700B, produced by The Nippon Synthetic Chemical Industry Co., Ltd.): 15 parts by mass
  Irgacure 184 (produced by CIBA JAPAN K.K.): 4 parts by mass
  $SnO_2$ (trade name: S-2000, φ=30 nm, refractive index: 1.997, produced by Mitsubishi Materials Corporation): 10 parts by mass
  Methyl isobutyl ketone (MIBK): 50 parts by mass Next, the composition for a hard coat layer (A) was applied to one side of a triacetylcellulose (TAC) substrate (TD80UL, produced by Fujifilm Corporation) having a thickness of 80 μm by a gravure roll coating method. Then, a solvent portion was evaporated to form a coating layer having a thickness of about 3.5 μm. Thereafter, the coating layer was irradiated with ultraviolet rays of 20 mJ/cm² from the coating layer side, and thereby semi-cured to form a coat. Subsequently, the composition for a hard coat layer (B) was applied to the coat by the gravure roll coating method so as to give a web speed and an application speed different from each other and thereby impart shear force, and dried to form a coating layer having a thickness of about 3.5 μm. Then, the coating layer was irradiated with ultraviolet rays of 100 mJ/cm² from the coating layer side, and thereby cured to form an optical layered body having a hard coat layer (A) and a hard coat layer (B) in this order on the TAC substrate. The adhesion was favorable between the TAC substrate and the hard coat layer (A), and between the hard coat layer (A) and the hard coat layer (B).

Example 2

An optical layered body was produced as in Example 1, except that the coating layer of the composition for a hard coat layer (B) was irradiated with ultraviolet rays of 20 mJ/cm² and thereby semi-cured. Subsequently, the below-mentioned composition C for a low refractive index layer was applied to the coated face side of the optical layered body by the gravure roll coating method, and a solvent portion was evaporated to form a coating layer having a thickness of about 0.1 μm. Then, the coating layer was irradiated with ultraviolet rays of 100 mJ/cm² from the coating layer side, and thereby cured to form an optical layered body.
(Composition C for Low Refractive Index Layer)
  Pentaerythritol triacrylate: 5 parts by mass
  Surface-treated hollow silica sol (φ=50 nm, 20%-MIBK diluted product): 25 parts by mass
  Irgacure 184: 0.4 parts by mass
  MEK: 70 parts by mass Example 3

The composition for a hard coat layer (B) shown in Table 1 was applied to one side of a mold-release-treated PET substrate (produced by Toray Industries, Inc.) having a thickness of 100 μm by a gravure roll coating method. Then, a solvent portion was evaporated to form a coating layer having a thickness of about 3.5 μm. Thereafter, the coating layer was irradiated with ultraviolet rays of 20 mJ/cm² from the coating layer side, and thereby semi-cured to form a coat. Subsequently, the composition for a hard coat layer (A) was applied to the coat by the gravure roll coating method so as to give a web speed and an application speed different from each other and thereby impart shear force, and dried to form a coating layer having a thickness of about 3.5 μm. Then, the coating layer was irradiated with ultraviolet rays of 100 mJ/cm² from the coating layer side, and thereby cured.

The below-mentioned adhesive composition was applied in a thickness of about 10 μm to the cured hard coat layer (A), and a solvent portion was evaporated. Then, the hard coat layer (A) was bonded together with the TAC substrate. This layered body was aged at 40° C. for 3 days to heat-cure the adhesive layer, and then a PET mold-release film was peeled, whereby an optical layered body was produced.
(Adhesive Composition (Two-Pack Type Thermosetting Urethane Adhesive))
  Main agent: LX 660 (produced by DIC): 8 parts by mass
  Curing agent: aromatic polyisocyanate KW75 (produced by DIC): 2 parts by mass
  Ethyl acetate: 32 parts by mass Examples 4 to 9, and 12, Comparative Examples 2 to 4, and Reference Example An optical layered body was produced as in Example 1, except that the composition for a hard coat layer (A) and the composition for a hard coat layer (B) which have the compositions shown in Tables 1 and 2 were used.

Dipentaerythritol hexaacrylate (DPHA), 1,6-hexanedioldiacrylate (HDDA), as well as the above PETA, were used as acrylic resin in Tables 1 and 2.

The same $SnO_2$ as in Example 1 was used as inorganic fine particles, and TDL-1 (trade name, refractive index: 2.0, particle size: 100 nm, produced by Mitsubishi Materials Corporation) was used as ATO.

Examples 10 and 11

An optical layered body was produced as in Example 1, except that the composition for a hard coat layer (A) having the composition shown in Table 1 and the composition for a hard coat layer (B) shown below were used.
(Composition for Hard Coat Layer (B))
(1) Preparation of Sequential Beaded Silica Fine Particles To 2000 g of silica fine particles (1) (SI-550, produced by JGC C&C, average particle size of primary particles: 5 nm, $SiO_2$ concentration: 20% by mass, Na in silica: 2700 ppm) was added 6000 g of ion exchange water. Subsequently, 400 g of cation exchange resin (SK-1BH, produced by Mitsubishi Chemical Corporation) was added to the mixture, which was then stirred for one hour and subjected to dealkalization. Thereafter, the cation exchange resin was separated, and 400 g of anion exchange resin (SANUPC, produced by Mitsubishi Chemical Corporation) was added to the resultant mixture, which was then stirred for one hour and subjected to deanionization. Then, 400 g of cation exchange resin (SK-1BH, produced by Mitsubishi Chemical Corporation) was again added to the mixture, which was then stirred for one hour and subjected to dealkalization to prepare a silica fine particle dispersion having an $SiO_2$ concentration of 5% by mass. In this case, the Na content in silica particles was 200 ppm.

Next, the pH of the dispersion was adjusted to 4.0 using a dilute hydrochloric acid, and the dispersion was treated in an autoclave at 200° C. for one hour. Subsequently, cation exchange resin was added, at room temperature, to the mixture, which was then stirred for one hour and subjected to dealkalization to separate the cation exchange resin. Thereafter, anion exchange resin was added to the mixture, which was then stirred for one hour and subjected to deanionization to prepare a sequential beaded silica fine particle dispersion having an $SiO_2$ concentration of 5% by mass. Here, the number of the sequential beaded silica fine particles bonded was 3 pieces on average.

Next, the sequential beaded silica fine particle dispersion having an $SiO_2$ concentration of 5% by mass was condensed to an $SiO_2$ concentration of 10% by mass, and the solvent was replaced with methanol by an ultrafiltration membrane method to prepare a sequential beaded silica fine particle methanol dispersion having an $SiO_2$ concentration of 10% by mass.

(2) Preparation of Reactive Sequential Beaded Silica Fine Particles (1)

To 93 parts by mass of the sequential beaded silica fine particle methanol dispersion prepared by the above method was added 1 part by mass of a methacrylic silane coupling agent (γ-methacryloxypropyltrimethoxysilane: KBM-503 by Shin-Etsu Chemical Co., Ltd.). Then, the entire solution was adjusted to have a pH of 4 with an HCl solution, and thereafter heated and stirred at 80° C. for 5 hours. Thereby, γ-methacryloxypropyltrimethoxysilane-treated silica fine particles (reactive sequential beaded silica fine particles A (1)) having a methacryloyl group on its surface were produced. The prepared solution was subjected to solvent replacement from methanol to methyl isobutyl ketone (MIBK), and an MIBK dispersion of the reactive sequential beaded silica fine particles A (1) having a solids content of 40% by mass was obtained.

(3) Preparation of Composition for Hard Coat Layer (B) (Example 10)

A composition for a hard coat layer (B) was prepared by blending ingredients in the following composition.

Reactive sequential beaded silica fine particles A (1): 150 parts by mass (solids content: 60 parts by mass)
Dipentaerythritol hexaacrylate (DPHA) (produced by Nippon Kayaku Co., Ltd.): 40 parts by mass
Irgacure 184 (trade name) (produced by CIBA JAPAN K.K., radical polymerization initiator): 4 parts by mass (4) Preparation of Composition for Hard Coat Layer (B) (Example 11)

A composition for a hard coat layer (B) was prepared by blending ingredients in the following composition.

Reactive sequential beaded silica fine particles A (1): 150 parts by mass (solids content: 70 parts by mass)
Dipentaerythritol hexaacrylate (DPHA) (produced by Nippon Kayaku Co., Ltd.): 30 parts by mass
Irgacure 184 (trade name) (produced by CIBA JAPAN K.K., radical polymerization initiator): 4 parts by mass Comparative Example 1

The composition for a hard coat layer (A), the same composition as used in Example 1, was applied to one side of a triacetylcellulose (TAC) substrate (TD80UL, produced by Fujifilm Corporation) having a thickness of 80 μm by a gravure roll coating method. Then, a solvent portion was evaporated to form a coating layer having a thickness of about 3.5 μm. Thereafter, the coating layer was irradiated with ultraviolet rays of 20 mJ/cm² from the coating layer side, and thereby semi-cured to form a coat. Subsequently, the composition for a hard coat layer (B), the same composition as used in Example 1, was applied to the coat by die coating so as to adjust a web speed and application conditions and thereby so as not to impart shear force, and dried to form a coating layer having a thickness of about 3.5 μm. Then, the coating layer was irradiated with ultraviolet rays of 100 mJ/cm² from the coating layer side, and thereby cured to form an optical layered body on the TAC substrate. The adhesion was favorable between the TAC substrate and the hard coat layer (A), and between the hard coat layer (A) and the hard coat layer (B).

Figure 2:
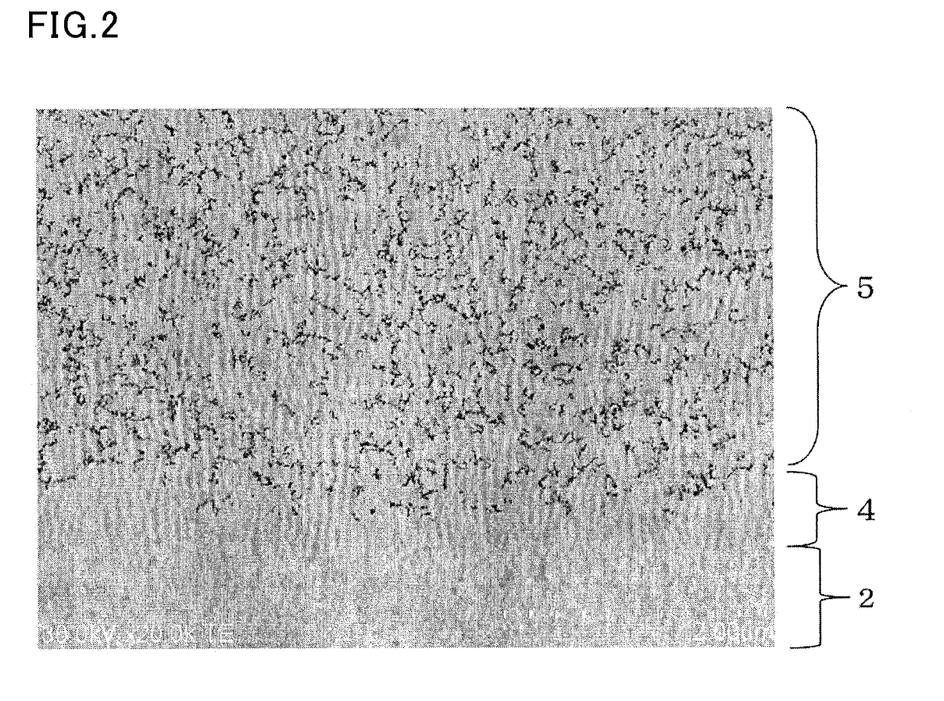
FIG. 2 is an electron microscope photograph of a partially enlarged cross-sectional view of an optical layered body according to Example 1.

The optical layered bodies obtained in the above examples, comparative examples, and reference example were evaluated on each item by the following measuring method. Table 3 shows the results. The cross section of each of the optical layered bodies was observed with an electron microscope by STEM. FIG. 2 is an electron microscope photograph of a cross sectional of the optical layered body according to Example 1.

<Hardness (Optical Layered Body)>

In accordance with JIS K5600-5-4 (1999), the test using pencils having different hardnesses at a load of 4.9 N was performed five times, and the number of times no cracks occurred was counted. In Table 3, for example, "⅖" means that cracks did not occur in two out of five trials.

<Curling Width>

A 10 cm×10 cm sample piece was cut out from the optical layered body, and was placed on a level stand (plane). Then, the distances from the respective end portions (four points) to the level stand (plane) were measured. The degree of curling (curling width) of the optical layered body was represented by the average value (mm) of these measured distances.

<Interference Fringes>

A black tape was attached to the side where no coat was formed of the optical layered body, and the optical layered body was visually observed under a three band fluorescent lamp. The case where interference fringes were not visually recognized was evaluated as "O", the case where they were slightly visually recognized was evaluated as "Δ", and the case where they were visually recognized was evaluated as "x". The symbol "–" in Table 3 means that interference fringes were not evaluated because transparent hard coat layers (B) were not formed.

<Hardness (Hard Coat Layer (A), Region (B1) not Containing Inorganic Fine Particles and Region (B2) Containing Inorganic Fine Particles of Hard Coat Layer (B))>

(1) Preparation of Sample Films for Measuring Hardness of Hard Coat Layer (A) and Region (B2) Containing Inorganic Fine Particles The composition for a hard coat layer (A) and the composition for a hard coat layer (B) in Tables 1 and 2 were applied to 50-μm PET substrates by a gravure roll coating method. Then, the solvent was dried, and cured with UV of about 120 mJ/cm², whereby a sample film for hard coat layer (A) and a sample film for a hard coat layer (B) were produced each with a resin film thickness of about 10 μm. The configurations of the produced sample films were a PET substrate/hard coat layer (A), and a PET substrate/region (B1) not containing inorganic fine particles/region (B2) containing inorganic fine particles.

(2) Preparation of Sample Film for Measuring Hardness of Region (B1) not Containing Inorganic Fine Particles Subsequently, each of the compositions for a hard coat layer (B) in Tables 1 and 2 was applied to a 50-μm mold-release-treated PET substrate by the gravure roll coating method so as to give a web speed and an application speed different from each other and thereby impart shear force, and cured with a UV of about 120 mJ/cm², whereby a sample having a resin film thickness of about 15 μm was produced.

Subsequently, a 50-μm PET substrate used in the item (1) described above was attached to one side of an optical transparent two-sided adhesive tape or film (for example, LUCI-ACS CS9622T produced by Nitto Denko Corporation) having a film thickness of 25 to 50 μm, and the surface of the formed hard coat layer (B) was attached to the other side via an adhesive. Thereafter, the mold-release-treated PET substrate was stripped, and thereby a mold-release-treated PET side face of the hard coat layer (B), that is, a face equivalent to the region (B1) not containing inorganic fine particles, was exposed. Thus, a sample film having the configuration of a PET substrate/adhesive/region (B2) containing inorganic fine particles/region (B1) not containing inorganic fine particles was produced.

The outermost surface of a measurement sample is preferably flat. Therefore, in the case where surface flatness was less likely to be obtained only with a composition for each layer, a leveling agent having a resin mass of 0.1 to 3% was appropriately added.

Three kinds of the produced sample films were each cut into a size of 2 cm×2 cm on a glass substrate, pasted up with an instant adhesive (Aron Alpha (registered trademark), produced by Toagosei Co., Ltd.), and left to stand at room temperature for one day.

The sample secured to this glass plate was placed on a test stand of a surface coating physical property tester (Picodenter HM500) produced by H. Fischer. Then, measurements were made with a push load of 10 mN, and the hardnesses were divided into five levels according to the obtained push depth and evaluated. The level 5 represents the highest hardness provided the level 1<2<3<4<5. A higher push depth means a more flexible sample, and a lower push depth means a harder sample. The symbol "–" in Table 3 means that the hardness was not evaluated because each layer did not exist.
1: 1.40 μm or more
2: 1.10 μm or more, and less than 1.40 μm
3: 0.90 μm or more, and less than 1.10 μm
4: 0.70 μm or more, and less than 0.90 μm
5: less than 0.70 μm

TABLE 1

| | Composition for hard coat layer | Acrylic resin parts by mass | Urethane resin parts by mass | Polymerization initiator parts by mass | Solvent parts by mass | Inorganic fine particles parts by mass |
|---|---|---|---|---|---|---|
| Example 1 | A | PETA 30 | 1700B 20 | Irg. 184 4 | MEK 50 | — |
| | B | PETA 25 | 1700B 15 | Irg. 184 4 | MIBK 50 | $SnO_2$ 10 |
| Example 2 | A | PETA 30 | 1700B 20 | Irg. 184 4 | MEK 50 | — |
| | B | PETA 25 | 1700B 15 | Irg. 184 4 | MIBK 50 | $SnO_2$ 10 |
| | (Composition C for low refractive index layer) | PETA 5 | — | Irg. 184 4 | MEK + MIBK 70 + 20 | $SnO_2$ 5 |
| Example 3 | A | DPHA 30 | 1700B 20 | Irg. 184 4 | MEK 50 | — |
| | B | DPHA 25 | 1700B 15 | Irg. 184 4 | Toluene 50 | $SnO_2$ 10 |
| Example 4 | A | HDDA 30 | 1700B 20 | Irg. 184 4 | MIBK 50 | — |
| | B | HDDA 25 | 1700B 15 | Irg. 184 4 | Toluene 50 | $SnO_2$ 10 |
| Example 5 | A | PETA 30 | 1700B 20 | Irg. 184 4 | MEK 50 | — |
| | B | DPHA 25 | 1700B 15 | Irg. 184 4 | Toluene 50 | $SnO_2$ 10 |
| Example 6 | A | PETA 30 | 1700B 20 | Irg. 184 4 | MEK 50 | — |
| | B | PETA 20 | 1700B 10 | Irg. 184 4 | Toluene 50 | $SnO_2$ 20 |
| Example 7 | A | PETA 30 | 1700B 20 | Irg. 184 4 | MEK 50 | — |
| | B | PETA 25 | 1700B 15 | Irg. 184 4 | Toluene 50 | ATO 10 |
| Example 8 | A | PETA 30 | 1700B 20 | Irg. 184 4 | MEK 50 | — |
| | B | PETA 20 | 1700B 15 | Irg. 184 4 | Toluene 50 | ATO 20 |
| Example 9 | A | PETA 30 | 1700B 20 | Irg. 184 4 | MEK 50 | — |
| | B | PETA 15 | 1700B 5 | Irg. 184 4 | Toluene 50 | $SnO_2$ 30 |
| Example 10 | A | PETA 30 | 1700B 20 | Irg. 184 4 | MEK 50 | — |
| | B | DPHA 40 | — | Irg. 184 4 | MIBK 90 | $SnO_2$ 60 |
| Example 11 | A | PETA 30 | 1700B 20 | Irg. 184 4 | MEK 50 | — |
| | B | DPHA 30 | — | Irg. 184 4 | MIBK 80 | $SnO_2$ 70 |

TABLE 1-continued

|  | Composition for hard coat layer | Acrylic resin parts by mass | Urethane resin parts by mass | Polymerization initiator parts by mass | Solvent parts by mass | Inorganic fine particles parts by mass |
|---|---|---|---|---|---|---|
| Example 12 | A | PETA 30 | 1700B 20 | Irg. 184 4 | MEK 50 | — |
|  | B | PETA 26 | 1700B 20 | Irg. 184 4 | Toluene 50 | $SnO_2$ 4 |

*"—" means no addition.

TABLE 2

|  | Composition for hard coat layer | Acrylic resin parts by mass | Urethane resin parts by mass | Polymerization initiator parts by mass | Solvent parts by mass | Inorganic fine particles parts by mass |
|---|---|---|---|---|---|---|
| Comparative Example 1 | A | PETA 30 | 1700B 20 | Irg. 184 4 | MEK 50 | — |
|  | B | PETA 25 | 1700B 15 | Irg. 184 4 | MIBK 50 | $SnO_2$ 10 |
| Comparative Example 2 | A | PETA 30 | 1700B 20 | Irg. 184 4 | MEK 50 | — |
|  | B | PETA 5 | — | Irg. 184 4 | Toluene 50 | $SnO_2$ 45 |
| Comparative Example 3 | A | PETA 25 | 1700B 15 | Irg. 184 4 | MEK 50 | $SnO_2$ 10 |
|  | B | PETA 30 | 1700B 20 | Irg. 184 4 | Toluene 50 | — |
| Comparative Example 4 | A | PETA 30 | 1700B 20 | Irg. 184 4 | MEK 50 | — |
|  | B | PETA 30 | 1700B 20 | Irg. 184 4 | Toluene 50 | — |
| Reference Example | A | PETA 25 | 1700B 15 | Irg. 184 4 | MEK 50 | $SnO_2$ 10 |
|  | B | PETA 25 | 1700B 15 | Irg. 184 4 | Toluene 50 | $SnO_2$ 10 |

*"—" means no addition.

TABLE 3

| | Pencil hardness | Curling width (mm) | Interference fringes | Push depth level (Layer A) | Push depth level (Region B1) | Push depth level (Region B2) |
|---|---|---|---|---|---|---|
| Example 1 | 3H:4/5 | 30 | ○ | 1 | 2 | 3 |
| Example 2 | 3H:4/5 | 25 | ○ | 1 | 2 | 3 |
| Example 3 | 3H:4/5 | 30 | ○ | 2 | 3 | 4 |
| Example 4 | 3H:4/5 | 25 | ○ | 1 | 2 | 3 |
| Example 5 | 3H:5/5 | 20 | ○ | 1 | 3 | 4 |
| Example 6 | 3H:5/5 | 25 | ○ | 1 | 2 | 3 |
| Example 7 | 3H:4/5 | 25 | ○ | 1 | 2 | 3 |
| Example 8 | 3H:5/5 | 20 | ○ | 1 | 2 | 3 |
| Example 9 | 3H:5/5 | 15 | ○ | 1 | 2 | 3 |
| Example 10 | 3H:4/5 | 30 | ○ | 1 | 2 | 3 |
| Example 11 | 4H:4/5 | 20 | ○ | 1 | 2 | 4 |
| Example 12 | 2H:4/5 | 30 | Δ | 1 | 2 | 2 |
| Comparative Example 1 | 2H:4/5 | 30 | X | 1 | — | 2 |
| Comparative Example 2 | 3H:4/5 | 5 | — | 1 | 2 | 3 |
| Comparative Example 3 | 2H:4/5 | 30 | X | 3 | 2 | — |
| Comparative Example 4 | 2H:3/5 | 40 | X | 1 | 2 | — |
| Reference Example | 3H:3/5 | 20 | ○ | 2 | 2 | 2 |

Table 3 shows that each of the optical layered bodies of the examples had a high hardness, no interference fringes, and a small curling width.

When the cross sections of the optical layered bodies of the examples and reference example were observed with an electron microscope, irregularities were recognized in hard coat layers (B). In contrast, no irregularities were observed in the optical layered bodies of the comparative examples. The optical layered body of Comparative Example 2 contains a large amount of inorganic fine particles in the composition for a hard coat layer (B), and thus only includes a region (B2) containing inorganic fine particles and does not include a region (B1) not containing inorganic fine particles.

INDUSTRIAL APPLICABILITY

The optical layered body of the present invention is suitably applicable to cathode ray tube (CRT) display devices, liquid crystal displays (LCD), plasma display panels (PDP), electroluminescence displays (ELD), field emission display (FED), and the like.

EXPLANATION OF SYMBOLS

1 Light-transmitting substrate
2 Hard coat layer (A)
3 Hard coat layer (B)
4 Region (B1) not containing inorganic fine particles
5 Region (B2) containing inorganic fine particles

The invention claimed is:

1. An optical layered body, comprising:
a light-transmitting substrate; and
a hard coat layer (A) and a hard coat layer (B) on one face of the light-transmitting substrate in this order,
wherein the hard coat layer (B) has a region (B1) not containing inorganic fine particles and a region (B2) containing inorganic fine particles, in this order from a portion adjacent to the hard coat layer (A),
a boundary between the region (B1) not containing inorganic fine particles and the region (B2) containing inorganic fine particles has irregularities,
the irregularities are formed depending on the presence of inorganic fine particles, and
the inorganic fine particles have a particle size smaller than a visible light wavelength.

2. The optical layered body according to claim 1,
wherein the region (B1) not containing inorganic fine particles contains a binder resin of the region (B2) containing inorganic fine particles as a main ingredient, and has an average thickness of a visible light wavelength or larger.

3. The optical layered body according to claim 1,
wherein the hardness (Ha) of the hard coat layer (A), the hardness (Hb1) of the region (B1) not containing inorganic fine particles, and the hardness (Hb2) of the region (B2) containing inorganic fine particles satisfy the following formula (1);

$$Ha \leq Hb1 < Hb2 \tag{1}$$

4. The optical layered body according to claim 1,
wherein the hard coat layer (B) contains 10 to 80% by mass of the inorganic fine particles.

5. A polarizer comprising a polarizing element,
wherein the polarizer includes the optical layered body according to claim 1, on a surface of the polarizing element.

6. An image display device, comprising:
the optical layered body according to claim 1, or the polarizer according to claim 5 on the outermost surface.

7. The optical layered body according to claim 2,
wherein the hardness (Ha) of the hard coat layer (A), the hardness (Hb1) of the region (B1) not containing inorganic fine particles, and the hardness (Hb2) of the region (B2) containing inorganic fine particles satisfy the following formula (1), $$Ha \leq Hb1 < Hb2 \tag{1}$$

8. The optical layered body according to claim 2,
wherein the hard coat layer (B) contains 10 to 80% by mass of the inorganic fine particles.

9. The optical layered body according to claim 3,
wherein the hard coat layer (B) contains 10 to 80% by mass of the inorganic fine particles.

10. A polarizer comprising a polarizing element,
wherein the polarizer includes the optical layered body according to claim 2, on a surface of the polarizing element.

11. A polarizer comprising a polarizing element,
wherein the polarizer includes the optical layered body according to claim 3, on a surface of the polarizing element.

12. A polarizer comprising a polarizing element,
wherein the polarizer includes the optical layered body according to claim 4, on a surface of the polarizing element.

13. A polarizer comprising a polarizing element,
wherein the polarizer includes the optical layered body according to claim 7, on a surface of the polarizing element.

14. A polarizer comprising a polarizing element,
wherein the polarizer includes the optical layered body according to claim 8, on a surface of the polarizing element.

15. A polarizer comprising a polarizing element,
wherein the polarizer includes the optical layered body according to claim 9, on a surface of the polarizing element.

16. An image display device, comprising:
the optical layered body according to claim 2, or the polarizer according to claim 10 on the outermost surface.

17. An image display device, comprising:
the optical layered body according to claim 3, or the polarizer according to claim 11 on the outermost surface.

18. An image display device, comprising:
the optical layered body according to claim 4, or the polarizer according to claim 12 on the outermost surface.

19. An image display device, comprising:
the optical layered body according to claim 7, or the polarizer according to claim 13 on the outermost surface.

20. An image display device, comprising:
the optical layered body according to claim 8, or the polarizer according to claim 14 on the outermost surface.

21. An image display device, comprising:
the optical layered body according to claim 9, or the polarizer according to claim 15 on the outermost surface.

* * * * *